United States Patent [19]

Compeau, deceased et al.

[11] 4,319,769
[45] Mar. 16, 1982

[54] TETHER BELT FOR PASSIVE SHOULDER BELT SYSTEM

[75] Inventors: Edward E. Compeau, deceased, late of Fraser, Mich., by Patricia J. Compeau, legal representative; James A. Winnale, Warren, Mich.

[73] Assignee: General Motors Corporation, Detroit, Mich.

[21] Appl. No.: 148,796

[22] Filed: May 12, 1980

[51] Int. Cl.³ ............................................. B60R 21/10
[52] U.S. Cl. .................................... 280/808; 280/803
[58] Field of Search ...................... 280/802, 803, 808; 297/481, 482, 483; 180/268

[56] References Cited

U.S. PATENT DOCUMENTS

| | | | |
|---|---|---|---|
| 3,521,901 | 7/1970 | Wackym | 280/808 |
| 3,679,229 | 7/1972 | Weststrate | 280/803 |
| 3,713,693 | 1/1973 | Cadiou | 297/389 |
| 3,860,261 | 1/1975 | Takada | 280/808 |
| 4,033,594 | 7/1977 | Lindblad | 297/481 |
| 4,039,224 | 8/1977 | Bauer | 280/804 |
| 4,223,914 | 9/1980 | Usami | 280/808 |
| 4,236,755 | 12/1980 | Pollitt | 297/483 |

Primary Examiner—Robert R. Song
Attorney, Agent, or Firm—C. E. Leahy

[57] ABSTRACT

A passive restraint belt system includes a shoulder belt having an outboard end mounted on the upper rear corner of the door and an inboard end retractably mounted on the body inboard the occupant seat. The retractor winds the belt to a diagonal restraining position across the occupant upper torso when the door is closed and permits outward and forward movement of the shoulder belt with the door to permit occupant ingress and regress when the door is opened. A tether belt has a first end attached to the shoulder belt intermediate the inboard and outboard ends and a second end connected to the door in vertically spaced relation from the outboard shoulder belt end. The length of the tether belt is adjustable by the occupant to deflect the diagonal path of the shoulder belt to fit the size of the particular occupant. The tether belt may be connected to the door by a reel which is rotatable to adjust the length of the tether belt. A clutch mechanism is associated with the reel to hold the tether belt at its adjusted length and is released manually by the occupant or automatically upon opening movement of the door.

3 Claims, 4 Drawing Figures

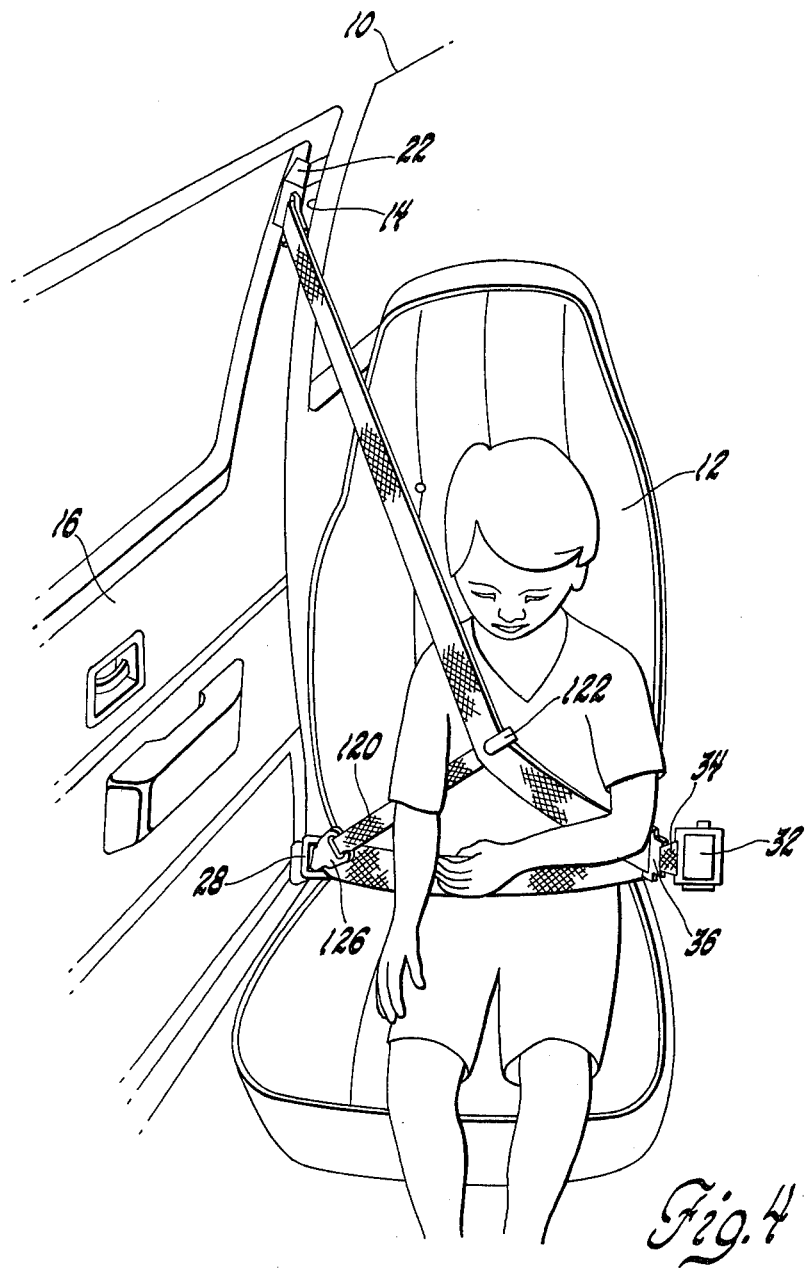

TETHER BELT FOR PASSIVE SHOULDER BELT SYSTEM

The invention relates to a door connected passive shoulder belt system and more particularly provides a tether belt acting between the door and the shoulder belt for deflecting the diagonal path of the shoulder belt to a restraint position particularly suited to the size of the seat occupant.

BACKGROUND OF THE INVENTION

It is recognized in the prior art that the comfort of a restrained seat occupant may be affected by the diagonal path of the shoulder belt across the upper torso of the occupant. It is also recognized that differing diagonal belt paths may be desired for occupant comfort depending upon the size of the seat occupant.

The prior art has recognized that diagonal path of the shoulder belt may be adjusted to accommodate persons of various size as well as to accommodate the different positions of the seated occupant. Wackym U.S. Pat. No. 3,521,901, issued July 28, 1970, provides an adjustable length strap assembly which is adjustable along a roof mounted support to lift the shoulder belt off the shoulder of the user. Other devices for deflecting the diagonal path of the shoulder belt are disclosed in U.S. Pat. Nos. Bauer et al 4,039,224, issued Aug. 2, 1977; Lindblad 4,033,594, issued July 5, 1977; Takada 3,860,261, issued Jan. 14, 1975; and Cadiou 3,713,693, issued Jan. 30, 1973.

The present invention provides a new and improved tether belt arrangement particularly suited to deflect the diagonal position of the shoulder belt in a passive belt system wherein the outboard end of the shoulder belt is carried by the vehicle door.

A passive belt system according to the invention includes a shoulder belt having an outboard end mounted on the upper rear corner of the door and an inboard end mounted on the vehicle body inboard the occupant seat by a retractor. The retractor winds the belt to establish the shoulder belt in a restraining position diagonally across the occupant torso when the door is closed and permits outward and forward movement of the shoulder belt with the door to permit occupant ingress and regress when the door is opened. A tether belt has a first end attached to the shoulder belt intermediate the inboard and outboard ends and a second end connected to the door in vertically spaced relation from the outboard shoulder belt end. Adjustment of length of the tether belt deflects the diagonal path of the shoulder belt to fit the size of a particular seat occupant. The tether belt may be connected to the door by a reel which is rotatable by the occupant to adjust the length of the tether belt. A clutch mechanism is associated with the reel to hold the tether belt at its adjusted length and may be released either manually or by the occupant or automatically upon opening movement of the door.

The object, feature and advantage of the invention resides in the provision of a door connected passive shoulder belt and a tether belt of adjustable length acting between the door and the shoulder belt to deflect the diagonal position of the shoulder belt to fit a particular sized occupant.

Another object, feature and advantage of the invention resides in the provision of the passive seat belt system including a shoulder belt connected to the upper rear corner of the door for movement therewith and a tether belt connected to the shoulder belt inboard of the outboard end and and adjustably mounted on the vehicle door by an occupant adjustable reel so that the occupant may deflect the diagonal shoulder belt position to a modified diagonal position providing optimum occupant comfort.

These and other objects, features and advantages of the invention will become apparent upon consideration of the specification and the appended drawings in which:

FIG. 4 is a perspective view of a second embodiment of the invention.

DESCRIPTION OF THE PREFERRED EMBODIMENT

Figure 1:
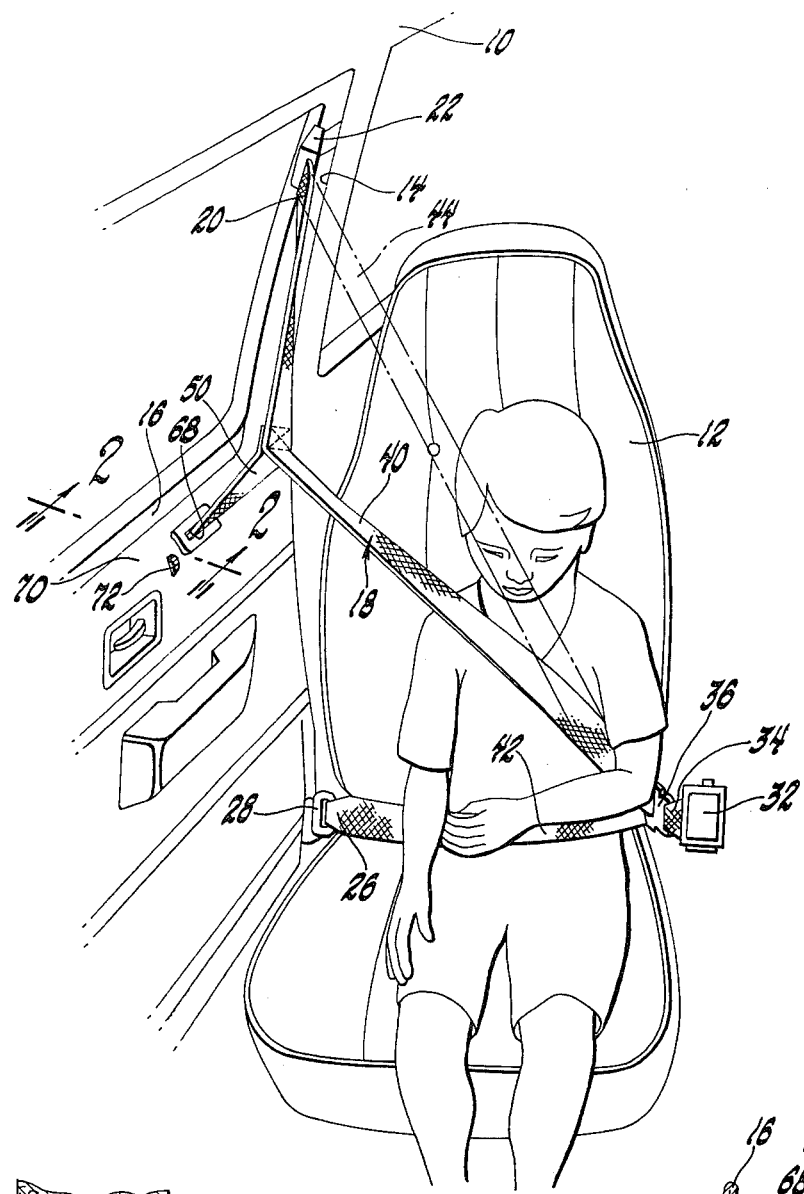
FIG. 1 is a perspective view of a door mounted passive shoulder belt system having a tether belt mounted on the door by a reel.

Referring to FIG. 1 there is shown a vehicle body 10 defining a passenger compartment in which an occupant seat 12 is mounted. Vehicle body 10 includes a door opening 14 which is selectively opened and closed by a door 16 having its forward edge, not shown, pivoted to the vehicle body for swinging movement between the closed position shown in FIG. 1 and an open position.

A restraint belt system for restraining an occupant on the seat 12 includes a continuous length restraint belt 18 having an upper end 20 connected to the upper rear corner of the door by a mounting bracket 22 and a lower end 26 attached to the lower rear corner of the door by a mounting bracket 28. A retractor 32 is mounted on the vehicle body inboard the seat and winds a control belt 34 which carries a junction ring 36. The junction ring 36 encircles the restraint belt 18 to define a shoulder belt 40 and a lap belt 42. Referring to FIG. 1, it is seen that when the door is closed, the shoulder belt 40 and control belt 34 cooperate to define a diagonal shoulder belt which passes over the shoulder of the occupant along the phantom-line indicated diagonal path 44. The lap belt 42 and control belt 34 likewise cooperate to define a lap belt which is disposed across the lower torso of the occupant.

As best seen in FIG. 1, the diagonal path of 44 of the shoulder belt 40 may not be optimally fitted for comfort of a short statured occupant such as a child. Accordingly, a tether belt 50 is provided for deflecting the diagonal path of the shoulder belt 40.

Figure 3:
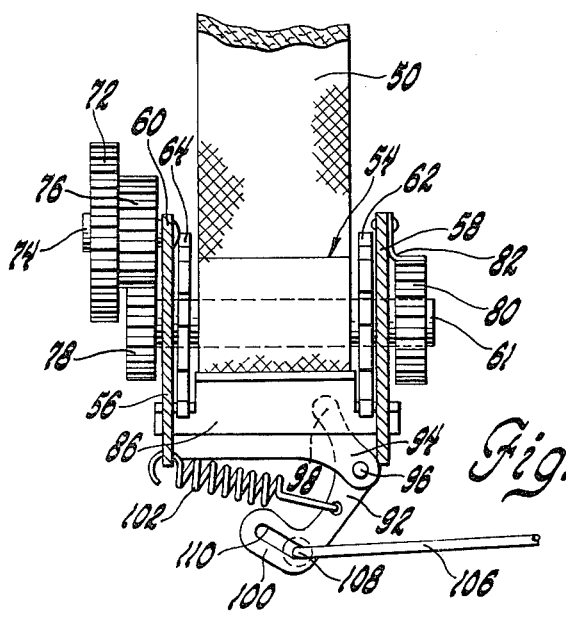
FIG. 3 is a view taken in the direction of arrows 3—3 of FIG. 2.
Figure 2:
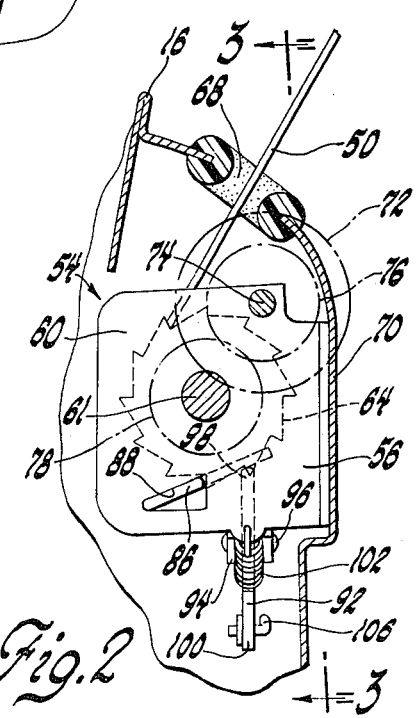
FIG. 2 is a sectional view taken in the direction of arrows 2—2 of FIG. 1 and showing the reel mounting the tether belt on the door.

As seen in FIG. 1, the tether belt 50 has an inboard end which is sewn or otherwise suitably attached to the shoulder belt 40 intermediate the mounting bracket 22 and the junction ring 36. Referring to FIGS. 2 and 3, it will understood that the inboard end of the tether belt 50 is mounted on the vehicle door 16 by a reel mechanism generally indicated at 54. The reel mechanism 54 includes a housing 56 having laterally spaced side walls 58 and 60. A reel shaft 61 extends through aligned apertures of the walls 58 and 60 and carries a pair of toothed ratchet plates 62 and 64. The outboard end of the tether belt 50 is attached to the reel shaft 61 between the ratchet plates 62 and 64 so that rotation of the reel shaft 61 will effect extension or retraction of the tether belt 50 through a belt slot 68 provided in the door inner panel 70.

The seat occupant may adjust the length of the tether belt 50 by rotating a thumb wheel 72 which extends through an opening of the door inner panel 70. Thumb wheel 72 is rotatably mounted on a pivot pin 74 attached to the housing wall 60. A gear 76 is attached to the thumb wheel 72 for rotation therewith and meshes with a mating gear 78 attached to the reel shaft 61. A detent gear 80 is attached to the other end of the reel shaft 61 and is engaged by a detent spring 82 and cooperates therewith to impose a drag on the reel shaft 61 so that the reel will remain at a selected adjusted position to establish the tether belt 50 at a desired adjusted length.

Referring to FIG. 1, it will be understood that rotation of the thumb wheel 72 will rotate the reel shaft 60 to retract the tether belt 50 and deflect the shoulder belt 40 to the solid line indicated diagonal position of FIG. 1.

Referring again to FIG. 1, it will be understood that forward leaning movement of the occupant would exert a force on the shoulder belt 40 tending to extend the tether belt 50 from the reel 54. Accordingly, a one-way clutch mechanism is associated with the reel 54 to block tether belt extension.

As best seen in FIGS. 2 and 3, a lock bar 86 has ends which extend through aligned apertures 88 of the housing walls 58 and 60 to mount the lock bar 86 for movement between the position of FIGS. 2 and 3 engaging the ratchet plates 62 and 64 and a disengaged position. A lever 92 is pivoted to a clevis 94 of the housing 56 by a pivot pin 96. The lever 92 includes an abutment end 98 which is engageable with the lock bar 86 and an operating end 100. A coil tension spring 102 acts between the housing wall 60 and the lever 92 urging the lever to the position of FIGS. 2 and 3 in which the lock bar engages the ratchet plates 62 and 64.

Referring to FIG. 2, it will be seen that occupant actuation of the thumb wheel 72 to rotate the reel shaft 61 in the counterclockwise direction will retract the tether belt 50 as the ratchet plates 62 and 64 ratchet relative the lock bar 86. If the occupant leans forward in the seat, the engagement of the lock bar with the ratchet plates 62 and 64 will prevent extension of the tether belt 50 from the reel 54 and the shoulder belt 40 will be maintained at its adjusted diagonal position.

Mechanism is also provided to disengage the one-way clutch mechanism on each occasion of opening the door. Referring to FIG. 3, it is seen that a cable 106 has a laterally bent end 108 which extends through an elongated slot 110 provided in the operating end 100 of the lever 92. The other end of the cable 106, not shown, is attached to a spring loaded plunger which projects through the door into engagement with the portion of the vehicle body 10 which defines the door opening 14. When the door is opened, the plunger projects outwardly to thereby rotate the lever 92 in a counterclockwise direction and permit the lock bar 86 to move downwardly out of engagement with the ratchet wheels 62 and 64. During the outward swinging movement of the door the shoulder belt portion 40 is permitted to assume a straight line diagonal position as permitted by unwinding of the tether belt 50 from the reel 54.

In addition to the door connected release mechanism for the one-way clutch, it may be desirable to provide a lever on the door accessible to the occupant by which the occupant may manually rotate the lever 92 to disengage the lock bar 86.

Referring to FIG. 4, another embodiment of the invention is shown and like elements of the passive belt system are designated by like numerals. In the FIG. 4 embodiment, a tether belt 120 has its inboard end attached to the shoulder belt by a removable plastic clip 122. The outboard end of the tether belt is connected to the door by a mounting bracket 126 which is adapted to attach to the mounting bracket 28 of the passive belt system. As seen in FIG. 4, the tether belt 120 may be positioned beneath the arm of the seated occupant. The tether belt 120 may incorporate a conventional length adjusting mechanism therein so that the length of the tether belt may be adjusted to obtain the desired diagonal position of the shoulder belt portion.

Thus it is seen that the invention provides a tether belt of adjustable length acting between the door and a door connected passive shoulder belt to deflect the diagonal position of the shoulder belt to fit the size of the particular occupant.

While the invention has been disclosed primarily in terms of the specific embodiment shown in the drawings, it is not intended to be limited thereto, but rather only to the extent set forth in the appended claims. For example, the shoulder belt system disclosed in the drawings is a continuous loop belt having a latch plate slidable therealong to define shoulder belt and lap belt portions. It will be understood that the teachings of this invention are applicable to other passive belt systems in which the shoulder has an upper end connected to the upper rear corner of the door.

The embodiments of the invention in which an exclusive property or privilege is claimed are defined as follows:

1. In combination: a vehicle body having a seat located laterally adjacent a door hinged for movement between open and closed positions; a shoulder belt having an outboard end mounted on the upper rear corner of the door and an inboard end; retractor means mounted on the vehicle body inboard the occupant seat for winding the inboard shoulder belt end to establish the shoulder belt in a restraining position diagonally across the occupant torso when the door is closed and permitting outward movement of the shoulder belt with the door to an occupant access position when the door is opened; a tether belt having a first end attached to the shoulder belt intermediate the outboard and inboard ends and a second end, and reel means rotatably mounted on the door in vertically spaced relation from the outboard shoulder belt end and having the second end of the tether belt connected thereto so that extension and retraction of the tether belt upon reel rotation causes the tether belt to deflect the diagonal path of the shoulder belt to a modified diagonal restraint position particularly suited to the size of the seat occupant.

2. In combination: a vehicle body having a seat located laterally adjacent a door hinged for movement between open and closed positions; a shoulder belt having an outboard end mounted on the upper rear corner of the door and an inboard end; retractor means mounted on the vehicle body inboard the occupant seat for winding the inboard shoulder belt end to establish the shoulder belt in a restraining position diagonally across the occupant torso when the door is closed and permitting outward movement of the shoulder belt with the door to an occupant access position when the door is opened; a tether belt having a first end attached to the shoulder belt intermediate the outboard and inboard ends and a second end, reel means rotatably mounted on the door in vertically spaced relation from the outboard shoulder belt end and having the second end of the tether belt connected thereto so that extension and retraction of the tether belt upon reel rotation causes the tether belt to deflect the diagonal path of the shoulder belt to a modified diagonal restraint position particularly suited to the size of the seat occupant, occupant operable means adapted to rotate the reel in the belt retracting direction, and releasable one-way clutch means associated with the reel and adapted to permit tether belt retracting rotation of the reel and block extending rotation of the reel, said one-way clutch being selectively releasable to permit tether belt extension.

3. In combination: a vehicle body having an occupant seating position located laterally adjacent a door hinged for movement between open and closed positions; a shoulder belt having an outboard end mounted on the vehicle body generally adjacent the seat occupant outboard shoulder and an inboard end mounted on the vehicle body generally adjacent the occupant inboard hip to establish the shoulder belt in a restraining position diagonally across the occupant torso; a tether belt having a first end and a second end, means attaching the first tether belt end to the shoulder belt intermediate the outboard and inboard ends, reel means rotatably mounted on the vehicle body in vertically spaced relation from the outboard shoulder belt end and having the second end of the tether belt connected thereto so that extension and retraction of the tether belt upon reel rotation causes the tether belt to deflect the diagonal path of the shoulder belt to a modified diagonal restraint position particularly suited to the size of the seat occupant.

* * * * *